W. H. SCHULTZ.
PIPE LIFTER.
APPLICATION FILED APR. 5, 1920.
1,364,589.
Patented Jan. 4, 1921.
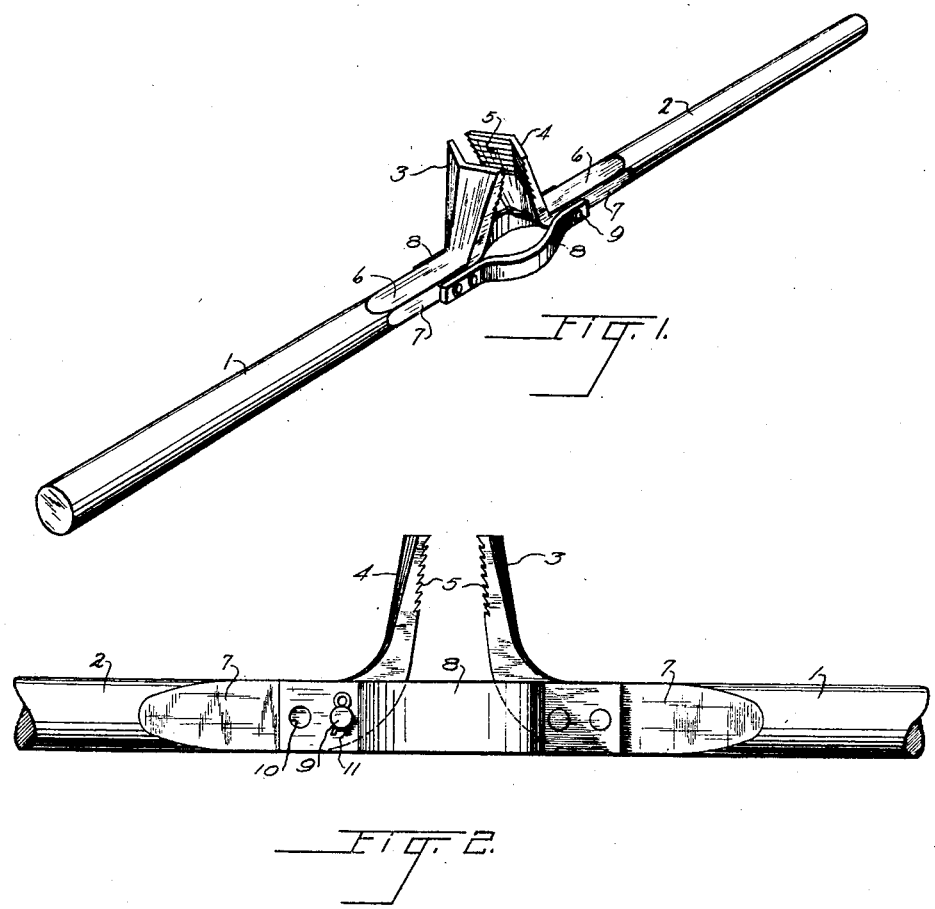

UNITED STATES PATENT OFFICE.

WILLIAM H. SCHULTZ, OF BARTLETT, ILLINOIS.

PIPE-LIFTER.

1,364,589. Specification of Letters Patent. Patented Jan. 4, 1921.

Application filed April 5, 1920. Serial No. 371,344.

*To all whom it may concern:*

Be it known that I, WILLIAM H. SCHULTZ, a citizen of the United States, and a resident of Bartlett, in the county of Cook and State of Illinois, have invented a new and useful Improvement in Pipe-Lifters, of which the following is a full, clear, and exact description.

My invention relates to improvements in devices for lifting pipes, especially those pipes which are used in connection with artesian wells, gas wells, etc., and it consists in the combinations, constructions and arrangements herein described and claimed.

An object of my invention is to provide a device by means of which a pipe may be raised quickly and with no danger of the pipe slipping during the raising operation.

A further object of my invention is to provide a tool which is simple in construction and which is not liable to easily get out of order.

A further object of my invention is to provide a tool having means for adjusting the gripping members to accommodate pipes of various sizes.

Other objects and advantages will appear in the following specification, and the novel features of the invention will be particularly pointed out in the appended claims.

My invention is illustrated in the accompanying drawings, forming part of this application, in which—

Figure 1 is a perspective view of the device, and

Fig. 2 is a plan view.

In carrying out my invention, I provide two gripping members consisting of rods 1 and 2, each of these rods being bent laterally at its inner ends and formed with gripping portions, such as that shown at 3 and 4 respectively. These gripping portions are expanded and are bent into a V-shape, being provided with corrugations 5 for permitting the firm gripping of the pipe. The rods 1 and 2 form handle portions. Between the gripping portions and the handle portions the rod is flattened, as shown at 6 and 7. The rod 1 is rigidly secured to a pair of bowed extensions 8. The rod 2 is adjustably secured to the extensions 8 by means of a pivot pin 9 which is arranged to enter openings 10 in the ends of the members 8, being held therein in any suitable manner, as by means of a cotter pin 11.

From the foregoing description of the various parts of the device, the operation thereof may be readily understood. In pulling or raising pipes the tool is opened and slipped over the upper end of the pipe, being lowered into position. The handles 1 and 2 are then grasped and raised, and in the mere operation of lifting, the gripping portions will engage the pipe and grip it firmly, so that there is no danger of the pipe slipping. The pipe is raised and then may be held in its raised position by any suitable means, while another hold is taken by merely lowering the handle. The gripping members swing away from the pipe and the tool may then be instantly lowered to another gripping position.

When it is desired to lift a larger pipe, the pin 9 may be shifted to the outer hole 10 by removing the cotter pin and changing the pivot pin 9.

The connecting extensions 8, besides serving as supports for the pivoted handle 2, also serve as guide members for the pipe itself, so that even though the tool may be loosened from the pipe, there is no danger of the pipe falling over as long as the handles are grasped, due to the fact that it is prevented from doing so by the encircling members 8.

It will be observed that the bowed extensions 8 are shaped to permit the same to slide over pipe couplings or connections which are somewhat greater in diameter than the pipe itself. It is, therefore, not necessary to remove the device as each connection or coupling is lifted.

I claim:

1. A pipe lifting device comprising a pair of oppositely disposed handles, the adjacent ends of said handles being bent laterally to form opposed V-shaped gripping members, a pair of bowed extensions rigidly secured to one of said handles, and means for pivoting the other handle and its gripping member between said bowed extensions.

2. A pipe raising tool comprising a pair of opposed handles, the adjacent ends of said handles being expanded and flattened and bent into a V-shaped form, a pair of bowed extensions rigidly secured to one of said handles at the junction of the laterally extending gripping portions with the handle, said extensions having a plurality of openings, and a pivot pin for the other handle and its gripping member arranged to enter the different openings in said extensions, whereby the handles and their gripping members may be adjusted with respect to one another.

WILLIAM H. SCHULTZ.